United States Patent [19]

Stewart

[11] Patent Number: 4,599,896
[45] Date of Patent: Jul. 15, 1986

[54] HIGH ACCURACY ACCELEROMETER

[75] Inventor: Robert E. Stewart, Woodland Hills, Calif.

[73] Assignee: Litton Systems, Inc., Beverly Hills, Calif.

[21] Appl. No.: 468,343

[22] Filed: Feb. 22, 1983

[51] Int. Cl.[4] .......................... G01P 15/13; G01V 7/00
[52] U.S. Cl. ................................. 73/382 R; 73/517 R; 73/517 B
[58] Field of Search ....................... 73/382, 510, 517 B, 73/517 R, 1 B, 1 C, 1 D

[56] References Cited

U.S. PATENT DOCUMENTS

| | | | |
|---|---|---|---|
| 2,132,865 | 10/1938 | Thyssen-Bornemisza | 73/382 |
| 2,559,919 | 7/1951 | Gustafsson | 73/382 |
| 2,842,351 | 7/1958 | Rodder | 73/382 |
| 3,071,008 | 1/1963 | Steele | 73/517 B |

Primary Examiner—Stephen A. Kreitman
Assistant Examiner—John E. Chapman, Jr.
Attorney, Agent, or Firm—Elliott N. Kramsky

[57] ABSTRACT

A method and apparatus for measuring acceleration and/or gravity are disclosed. At least one auxiliary mass is provided which, in cooperation with apparatus in accordance with the invention, is alternately engaged to and disengaged from the proofmass of an accelerometer to provide two distinct torque values, each value including a pendulosity-modulated component and an unmodulated component from which a value of acceleration and/or gravity may be extracted that is essentially free from bias uncertainty.

15 Claims, 4 Drawing Figures

HIGH ACCURACY ACCELEROMETER

BACKGROUND OF THE INVENTION

1. Field of the Invention

The present invention pertains to methods and instruments for measuring inertial and gravitational forces. More particularly, this invention is directed to methods and apparatus for reducing accelerometer error in the measurement of acceleration and/or gravity.

2. Description of the Prior Art

Accelerometer bias uncertainty is one of the fundamental error sources in inertial navigation systems. Such error represents the portion of the accelerometer bias that varies with time, temperature, thermal gradient, magnetic field, radiation, mounting force, mechanical shock and vibration, pressure, humidity, etc. Bias uncertainties in excess of 100 ug, which exceed the bounds of acceptable error in numerous present-day applications, are typical of present-day accelerometers.

Efforts to lower this source of error in pendulous-type systems have involved the compromise of significant instrument parameters. Such attempts include designs that lower the ratio of the suspension spring rate to proofmass pendulosity. This general approach leads to lower shock and vibration capabilities and to reduced structural natural frequencies which, in turn, limit the bandwidth of the servo, lower midband gain and frequency, and cause the minimum stiffness of the servo to coincide with the resonant frequency of the system isolators.(The latter effect limits the maximum dynamic g capability of the accelerometer.) Additionally, lowered structural natural frequencies can coincide with gyro-induced vibrations, requiring the "tuning" of the accelerometer's suspension to minimize rectification effects.

Other attempts have centered upon correction of the portion of uncertainty that results from hysteresis and suspension elastic after-effect. Such proposed solutions have proven costly, involving precision manufacture and instrument adjustment. Thus, current methods for minimizing bias uncertainty have generally increased costs significantly, reduced system dynamic performance and lowered environmental capabilities.

SUMMARY OF THE INVENTION

The present invention overcomes the above-described and additional shortcomings of the prior art by providing, in a first aspect, a method for measuring the acceleration of a body accurately. The method includes the steps of mounting an apparatus that includes an inertial mass to the body, then varying the center of gravity of the mass between two preselected values as the body is accelerated. The method includes the further steps of measuring torque values of the mass corresponding to the two preselected values of the mass as the body is accelerated, then determining the difference between the two torque values and applying a predetermined scale factor to the difference.

In a second aspect, there is provided a method for measuring gravity accurately. Apparatus is provided that includes an inertial mass. Such apparatus is then tilted as the value of the mass is varied between preselected values. The torque values corresponding to the preselected mass values are then measured, the difference therebetween measured and a predetermined scale factor applied to that difference.

In a third aspect, the present invention provides an additional method for measuring the acceleration of a body accurately. Such method includes the step of mounting pendulous-type measurement apparatus to the body, then varying the pendulosity of the apparatus between two preselected values as the body is accelerated. The torque values of the apparatus corresponding to the two preselected values of pendulosity are measured as the body is accelerated then the difference between the two torque values is determined and a predetermined scale factor applied to such difference.

In a fourth aspect there is provided a method for measuring gravity accurately utilizing pendulous-type measurement apparatus. Such apparatus is tilted as the pendulosity of the apparatus is varied between two preselected values. The torque values of the apparatus corresponding to the two preselected values of pendulosity are then measured, the difference between the two values determined and a scale factor applied to the difference.

In a fifth aspect, the invention presents apparatus for measuring acceleration. Such apparatus includes a pendulous mass including a proofmass. There is additionally provided means for varying the pendulosity of the mass and means for measuring the torque upon the proofmass.

The foregoing and additional features and advantages of the present invention will become apparent from the detailed description which follows. The description is accompanied by a set of drawing figures in which like numerals, corresponding to numerals of the detailed description, refer to like features throughout.

DETAILED DESCRIPTION

Figure 1:
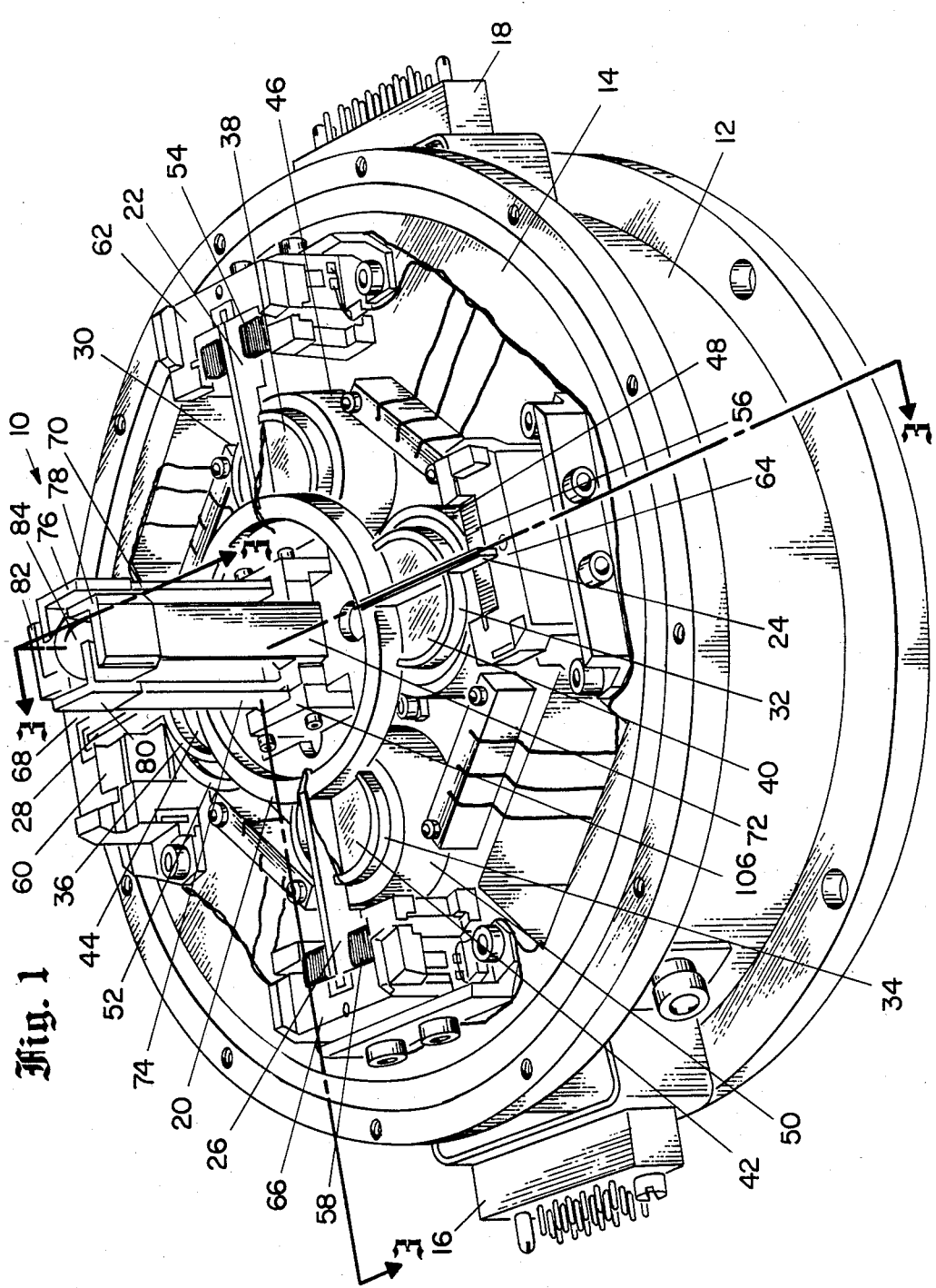
FIG. 1 is a perspective view of an accelerometer in accordance with the present invention.

FIG. 1 is a view, in perspective, of an accelerometer 10 in accordance with the invention. (In operation, a cover is fixed over a substantial portion of the apparatus shown in FIG. 1, the cover having been removed to facilitate the view.) The accelerometer 10 includes a case 12 that is fixed to the accelerating body as distinguished from the inertial elements of the accelerometer, known generally as its "proofmass", that react during acceleration.

The case 12 includes a planar upper surface 14 and fixtures 16 and 18 that provide points of attachment for conductors in electrical communication with input and output electronics, including servomechanisms, that measure and control the reactions of the proofmass along the orthogonal measuring axes of the instrument.

A ring 20 forms a substantial portion of the proofmass of the accelerometer 10. Struts 22, 24, 26 and 28 that radiate generally therefrom define, in pairs, the orthogonal axes of the (two axis) accelerometer 10. Ring-like coil supports 30, 32, 34, and 36 underlie the ring 20 and radial struts 22, 24, 26 and 28 respectively. As will be seen in FIG. 3, the coil supports overlie servo-controlled torquer coils which provide corrective forces for restoring the proofmass to its null position during acceleration.

Bucking magnets 38, 40, 42 and 44 are located at the centers of the coil supports. The bucking magnets comprise portions of four separate torquer magnet assemblies 46, 48, 50 and 52. Additional details of a typical assembly will be seen in the cross sectional view of FIG. 3. While the torquer coils, in conjunction with the torquer magnet assemblies, provide corrective forces for maintaining the null position of the proofmass, coils 54, 56, 58 and 60, in conjunction with additional sets of coils positioned within yokes 62, 64, 66 and 68 respectively, excite fields that allow the detection of displacements of pickoff coils (not shown) that are fixed to struts 22, 24, 26 and 28 respectively in response to sensed acceleration. As a result, error signals are produced during acceleration that are utilized by the instrument to drive servomechanisms which control the currents in the torquer coils.

A substantially vertical structure is centered about the ring 20 of the proofmass. This structure, only the upper half of which can be seen in FIG. 1, includes apparatus that allows the accelerometer to generate a plurality of proofmass torque measurements which are processed in accordance with the invention to produce acceleration data with reduced bias uncertainty. Three vertical piezoelectric strips 70, 72 and 74 can be seen to surround the vertical structure. (A fourth strip, opposite the strip 72, cannot be seen in the perspective view of FIG. 1.) The strips are joined at their upper ends, by means of epoxy or like fastening means, to side walls 76, 78, 80 and 82 respectively. Each side wall shown includes an interior wedge-like structure for retaining a spherical upper auxiliary mass 84 in one of two configurations. ("Case-fixed" or "proofmass-fixed") Detail of the structures for retaining the auxiliary mass 84 (and a like spherical lower auxiliary mass not seen in FIG. 1) are shown in FIG. 2, an enlarged exploded perspective view thereof.

Figure 2:
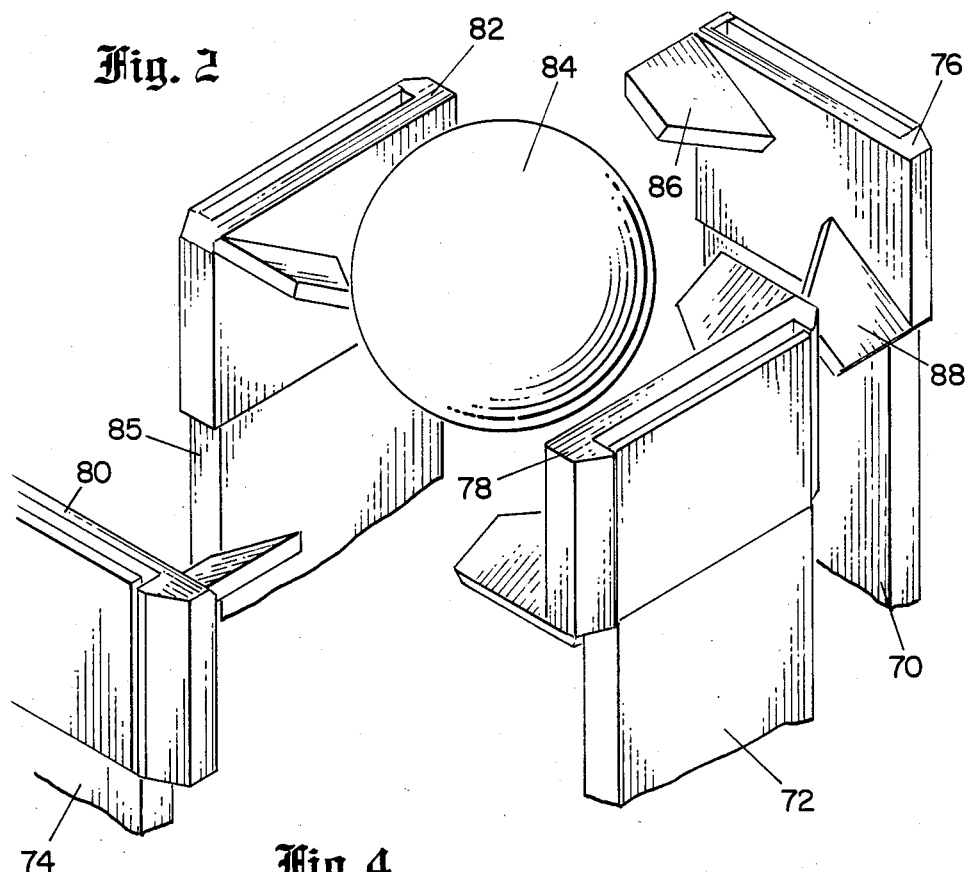
FIG. 2 is an exploded perspective view of apparatus for engaging an auxiliary mass in accordance with the invention.

Turning to FIG. 2, one can see that the apparatus for retaining the spherical mass 84 comprises opposed pairs of side walls 76, 80 and 78, 82 respectively. As mentioned above, the side walls are fixed to the ends of the vertical upper piezoelectric strips 70, 74 and 72, 85 (not shown in FIG. 1), respectively. Strips 72 and 85 are fixed to the accelerometer proofmass at the ring 20 while strips 70 and 74 are fixed to the case 12 by means of an arm 106, shown in FIGS. 1 and 3, that is connected to the upper portion of the suspension of the accelerometer.

As can be seen in FIG. 2, the inner surfaces of the side walls 76, 78, 80 and 82 include paired, planar protrusions (such as the protrusions 86 and 88 associated with side wall 76 having inclined opposed edges that act as retaining wedges. These retaining wedges are dimensioned to secure the auxiliary mass selectively to one of the two sets of opposed side walls in accordance with control voltages applied, in pairs, to opposed upper piezoelectric strips. Each piezoelectric strip comprises two sheets of piezoelectric material of opposed polarity. The sheets are bonded to a thin common beam of metal or the like. When a voltage of first polarity is applied to the sheets, one sheet will tend to expand and the other to contract, effecting the bending of the composite in a first direction. The direction of bending is reversed when the polarity of the applied voltage is reversed. As only one end of each strip is fixed (the ends to which the side walls are attached are free), the free end will flex outwardly or inwardly in accordance with the polarity of the applied voltage. Voltages of alternating polarity are applied to different opposed pairs of piezoelectric strips at a preselected frequency so that the sphere is "grabbed" by, and therefore forms an element of, either the proofmass or the case with such frequency during operation.

Figure 3:
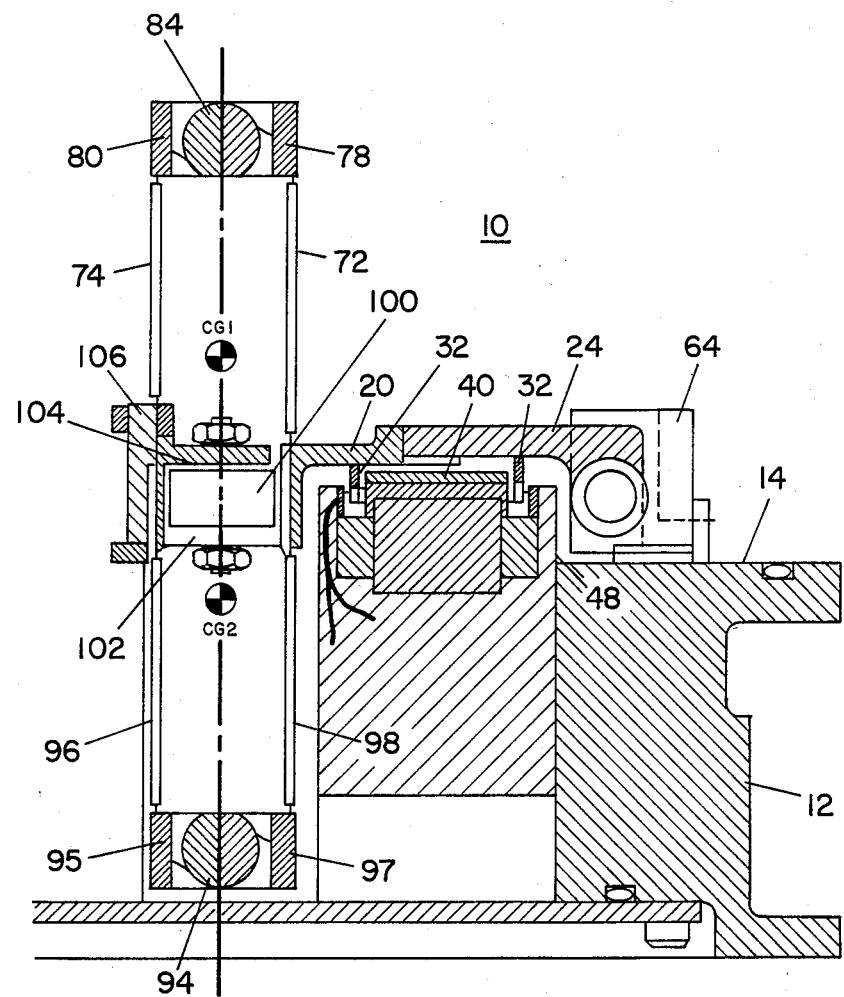
FIG. 3 is a view of the accelerometer of FIG. 1 partially broken away to illustrate features thereof.

FIG. 3 is a view of the accelerometer 10 partially broken away to illustrate additional features thereof. As can be seen in this Figure, a spherical lower auxiliary mass 94 is positioned near the bottom of the accelerometer. The lower mass is retained within a grasping arrangement that is functionally identical to that illustrated in FIG. 2 for retaining the upper mass 84. Side wall 95, including a wedge-like structure at its inner side as shown in FIG. 2, is secured to a lower case-fixed piezoelectric strip 96 while side wall 97 is secured to a lower proofmass-fixed piezoelectric strip 98. As shown in FIG. 3, the case-fixed piezoelectric strips 74 and 96 are fixed, by means of epoxy, to structures that engage the upper end 104 of an accelerometer suspension 100 which, in turn, is rigidly engaged to the case-fixed arm 106. The proofmass-fixed piezoelectric strips 72 and 98 are similarly fixed to the inner edge of the ring 20.

The notations "CG1" and "CG2" of FIG. 3 indicate two distinct centers of gravity for the overall proofmass. These are established through alternating engagement of the upper and lower auxiliary masses 84 and 94 to the proofmass and to the case, respectively. (In operation, the proofmass of the accelerometer 10 comprises, in addition to the ring 20 and the four radial struts, the four pick-off coils, the four torquer coils, one pair of (upper or lower) piezoelectric strips and associated side walls, the lower portion of the suspension 100 and one of the (upper or lower) auxiliary masses.)

Figure 4:
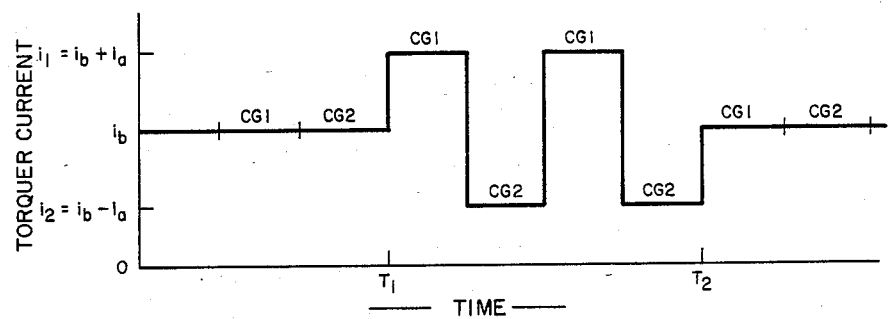
FIG. 4 is a graph of the output of an accelerometer in accordance with the invention as a function of acceleration and proofmass center of gravity.

FIG. 4 is a graph which illustrates the operation and theoretical basis for measurement of acceleration or gravity in accordance with the present invention whereby the bias uncertainty inherent in such measurements is readily overcome. As is well known in the art, accelerometers are commonly employed to detect gravity. An accelerometer at rest may be tilted about an axis perpendicular to its sensitive axis and the component of the gravitational field thereby measured by the instrument.

The notations CG1 and CG2 indicate the two distinct locations of the center of gravity of the proofmass of the accelerometer. The location of the center of gravity of the proofmass is a function in each instance of proofmass configuration. As above-mentioned, two separate configurations may be achieved in accordance with the described invention, the configuration differing by the identity of the auxiliary mass, upper or lower, which is associated with the proofmass in response to control voltages applied to the upper and lower sets of piezoelectric strips. Control voltages are applied to the upper and lower sets of piezoelectric strips in such a manner that the upper and lower auxiliary masses are alternately case-fixed and proofmass-fixed (i.e., grasped by opposed sets of piezoelectric strips which are fixed directly or indirectly to the case 12 or to the ring 20.) As the spherical auxiliary masses need not be of equal size and/or distance from the center of suspension 100, the alternating positions of the center of gravity of the proofmass change the pendulosity of the accelerometer 10 and the polarity of the torque thereof.

As indicated in FIG. 4, prior to acceleration or tilt in a gravitational field(in the event that gravity is to be detected), the switching of the center of gravity of the proofmass does not effect the current, $i_b$, required to maintain the null position of the proofmass. T1 indicates the initiation of acceleration or tilt. As can be observed, the torquer current is increased at this time by the amount $i_a$. This indicates that a current of $i_b + i_a$ is now required to maintain the proofmass at null with its center of gravity in the GC1 position (this corresponds to the application of a set of voltages to the upper and lower sets of piezoelectric strips such that the upper auxiliary mass is proofmass-fixed while the lower auxiliary mass is case-fixed.)

As the body continues to accelerate or to be tilted, the center of gravity of the proofmass is switched to the CG2 position by a reversal of control voltages (upper auxiliary mass case-fixed, lower mass proofmass-fixed), causing the torquer current to be reduced to $i_b - i_a$. The change in torquer current from a value greater than $i_b$ to a value less than $i_b$ indicates a reversal in the polarity of the portion of the torque of the accelerometer that is attributable to an auxiliary mass. The aforementioned alternation of output torque values between $i_b + i_a$ and $i_b - i_a$ can be seen in FIG. 4 to continue as the upper and lower masses are alternately rendered proofmass-fixed and case-fixed.

By providing two measurements of torque as the body is accelerated or tilted, an accurate measurement of acceleration or gravity component, including a substantial reduction in uncertainty bias, can be obtained. This measure of acceleration or gravity component is equal to the difference between the torques produced by the two pendulosities of the proofmass during acceleration times an appropriate scale factor. In the example illustrated in FIG. 4, the difference in torque measurement is $(i_b + i_a) - (i_b - i_a) = 2i_a$. Thus the bias uncertainty, $i_b$, may be removed from the torque measurement. Physically, the above-stated result derives from the fact that the torquer current includes two distinct components, one of which is time-varying with accelerometer pendulosity, having an amplitude that is proportional to applied acceleration or gravity component and pendulosity. The other component of the output represents bias both at steady state and under transient conditions and is not modulated by pendulosity. Thus, by measuring torquer current at two differing pendulosities then taking the difference therebetween, one is provided with a composite value representing a multiple of the portion of torquer current that is a function of pendulosity and acceleration or gravity component. Substantially no portion of that value corresponds to the portion of torquer current representing bias uncertainty that is independent of pendulosity and acceleration or gravity component since this term, $i_b$, is cancelled in the subtraction process. In the example shown in FIG. 4, it is noted that, by switching the center of gravity of the proofmass, pendulosities of opposite polarity are obtained. As a result, in calculating torquer current (prior to applying a scale factor to convert to acceleration or gravity component), twice the measurement sensitivity is obtained. Such increased measurement sensitivity may be obtained and the invention practiced by methods and apparatus other than those which reverse the polarity of the proofmass. Two different values of pendulosity, with or without a reversal of polarity, will produce distinct values of torquer current during acceleration or tilt, each including portions that are pendulosity modulated and unmodulated from which a value, having a substantially reduced uncertainty bias, may be derived in the manner described above. Further, the teachings of this invention may be adapted to a non-pendulous inertial accelerometer by varying the proofmass between preselected mass values.

Thus, it is seen that there has been brought to the acceleration and gravity measurement arts a new method and new and improved apparatus for deriving data whereby the value of acceleration or gravity component of a body may be determined and extracted from the inherent measurement bias uncertainty. Utilizing apparatus in accordance with the invention one may overcome inaccuracies of the prior art without compensation modeling and/or degrading the frequency response of the accelerometer itself.

Further as one skilled in the art will readily appreciate, that portion of bias uncertainty that results from nonlinearities of the forcer or pickoff, anisoelasticity of suspension, anisoinertia of the proofmass and insufficient loop stiffness, (producing vibropendulous effects) is eliminated by apparatus in accordance with the invention in which such second order terms, otherwise additive, are cancelled. This nonlinear portion of the bias is eliminated by means of a system which, unlike the pior art, does not employ large and costly pendulous integrating gyro accelerometers that require, in turn, gimbals for isolation from vehicle angular rates. Such systems are, in addition, incompatible with present-day strapdown systems.

Also, as bias and bias variation are not functions of suspension spring rate, the accelerometer suspension can be made more rugged than in the prior art, reducing the potential over-stressing or fatigue of the suspension from external vibrations that coincide with resonant frequencies.

While this invention has been described in a preferred embodiment, it must be kept in mind that all other embodiments falling within the language of the claims that follow are intended to be included within its scope.

What is claimed is:

1. Apparatus comprising, in combination:
   (a) a pendulous mass including a proofmass;
   (b) means for varying the center of gravity of said proofmass as said apparatus is accelerated; and
   (c) means for measuring the torque of said proofmass.

2. Apparatus as defined in claim 1 wherein said means for varying the center of gravity of said proofmass further comprises:
   (a) at least one auxiliary mass; and
   (b) means for engaging said at least one auxiliary mass to and disengaging said at least one auxiliary mass from said proofmass.

3. Apparatus as defined in claim 2 wherein said means for engaging and disengaging includes a plurality of strips of piezoelectric material.

4. Apparatus as defined in claim 3 further characterized in that said means for engaging and disengaging includes pairs of wedges for grasping said auxiliary mass.

5. A method for measuring the acceleration of a body accurately comprising the steps of:
   (a) mounting apparatus including a pendulous mass to said body;
   (b) varying the center of gravity of said mass between two preselected values as said body is accelerated; and (c) measuring the torque values of said apparatus corresponding to said two preselected values of center of gravity as said body is accelerated; then (d) determining the difference between said two torque values, and (e) applying a predetermined scale factor to said difference.

6. A method as defined in claim 5 wherein the step of varying the pendulosity additionally includes the step of varying the center of gravity of the pendulous mass of said apparatus.

7. A method as defined in claim 6 wherein the step of varying the center of gravity of said pendulous mass includes the steps of:

(a) providing at least one auxiliary mass; and (b) alternately engaging said auxiliary mass to and disengaging said auxiliary mass from the proofmass of said apparatus.

8. A method as defined in claim 7 wherein two auxiliary masses are provided.

9. A method as defined in claim 8 wherein said auxiliary masses are so arranged that they contribute torque values of opposite polarity.

10. A method for measuring gravity accurately comprising the steps of:

(a) providing an apparatus including a pendulous mass; then (b) attaching said apparatus to a body; then (c) tilting said body in a gravitational field; and (d) varying the center of gravity of said mass between two preselected values when said body is tilted so as to provide torque values of opposite polarity; and (e) measuring the torque values corresponding to said two centers of gravity of said mass; then (f) determining the difference between said two torque values; and (g) applying a predetermined scale factor to said difference.

11. A method for measuring gravity accurately comprising the steps of:

(a) providing a measurement apparatus including a pendulous mass;

(b) tilting said apparatus; and (c) varying the center of gravity of said mass between two preselected values; and (d) measuring the torque values of said apparatus corresponding to said two preselected values of center of gravity; then (e) determining the difference between said two torque values; and (f) applying a predetermined scale factor to said difference.

12. A method as defined in claim 11 wherein the step of varying the pendulosity additionally includes the step of varying the center of gravity of the pendulous mass of said apparatus.

13. A method as defined in claim 12 wherein the step of varying the center of gravity of said pendulous mass includes the steps of:

(a) providing at least one auxiliary mass; and (b) alternately engaging said auxiliary mass to and disengaging said auxiliary mass from the proofmass of said apparatus.

14. A method as defined in claim 13 wherein two auxiliary masses are provided.

15. A method as defined in claim 14 wherein said auxiliary masses are so arranged that they contribute torque values of opposite polarity.

* * * * *